United States Patent
Hwang

(10) Patent No.: US 12,131,493 B2
(45) Date of Patent: Oct. 29, 2024

(54) APPARATUS AND METHOD FOR GENERATING DEPTH MAP USING MONOCULAR IMAGE

(71) Applicant: PUSAN NATIONAL UNIVERSITY INDUSTRY-UNIVERSITY COOPERATION FOUNDATION, Busan (KR)

(72) Inventor: Won Joo Hwang, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 193 days.

(21) Appl. No.: 17/338,999

(22) Filed: Jun. 4, 2021

(65) Prior Publication Data

US 2022/0351399 A1 Nov. 3, 2022

(30) Foreign Application Priority Data

Apr. 28, 2021 (KR) .......................... 10-2021-0054824

(51) Int. Cl.
*G06T 7/593* (2017.01)
*G06N 3/045* (2023.01)

(52) U.S. Cl.
CPC ............ *G06T 7/593* (2017.01); *G06N 3/045* (2023.01); *G06T 2207/10016* (2013.01); *G06T 2207/10028* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

2021/0090280 A1\* 3/2021 Guizilini ............. H04N 13/271

FOREIGN PATENT DOCUMENTS

KR 10-2103944 B1 4/2020

OTHER PUBLICATIONS

Howard et al., "Searching for MobileNetV3," 2019, 2019 IEEE/CVF International Conference on Computer Vision (ICCV), pp. 1314-1324. (Year: 2019).\*
Y. Wang, "MobileDepth: Efficient Monocular Depth Prediction on Mobile Devices," 2020, in Computing Research Repository (CoRR), abs/2011.10189. (Year: 2020).\*
Z. Wang et al., "Deep Learning for Image Super-resolution: A Survey," 2019, in Computing Research Repository (CoRR), abs/1902.06068. (Year: 2019).\*

(Continued)

*Primary Examiner* — Emily C Terrell
*Assistant Examiner* — Julia Z. Yao
(74) *Attorney, Agent, or Firm* — Paratus Law Group, PLLC

(57) ABSTRACT

Disclosed is an apparatus for generating a depth map using a monocular image. The apparatus includes: a deep convolution neural network (DCNN) optimized based on an encoder and decoder architecture. The encoder extracts one or more features from the monocular image according to the number of provided feature layers, and the decoder calculates displacements of mismatched pixels from the features extracted from different feature layers, and generates the depth map for the monocular image.

6 Claims, 4 Drawing Sheets

(56) References Cited

OTHER PUBLICATIONS

Hu et al., "Squeeze-and-Excitation Networks," 2018, 2018 IEEE/CVF Conference on Computer Vision and Pattern Recognition, pp. 7132-7141 (Year: 2018).*

Lyu et al., "HR-Depth: High Resolution Self-Supervised Monocular Depth Estimation," 2020, in Computing Research Repository (CoRR), abs/2011.10189. (Year: 2020).*

Takagi et al., "Boosting Monocular Depth Estimation with Channel Attention and Mutual Learning," 2019, 2019 Joint 8th International Conference on Informatics, Electronics & Vision (ICIEV) and 2019 3rd International Conference on Imaging, Vision & Pattern Recognition (icIVPR) (Year: 2019).*

Li et al., "Deep attention-based classification network for robust depth prediction," 2018, in Computing Research Repository (CoRR) , abs/1807.03959 (Year: 2018).*

Rundo et al., "USE-Net: Incorporating Squeeze-and-Excitation blocks into U-Net for prostate zonal segmentation of multi-institutional MRI datasets," Neurocomputing, vol. 365, pp. 31-43, 2019, https://doi.org/10.1016/j.neucom.2019.07.006 (Year: 2019).*

Chen et al., "Unsupervised Monocular Depth Estimation with Encoder-decoder Network," 2019 IEEE International Conference on Robotics and Biomimetics (ROBIO), Dali, China, 2019, pp. 2601-2606, doi: 10.1109/ROBIO49542.2019.8961751. (Year: 2019).*

Durasov et al., "Double Refinement Network for Efficient Monocular Depth Estimation," 2019 IEEE/RSJ International Conference on Intelligent Robots and Systems (IROS), Macau, China, 2019, pp. 5889-5894, doi: 10.1109/IROS40897.2019.8968227. (Year: 2019).*

Korean Office Action for related KR Application No. 10-2021-0054824 mailed Jul. 25, 2023 from Korean Intellectual Property Office.

Clement Godard et al., "Digging Into Self-Supervised Monocular Depth Estimation", 2019 IEEE/CVF International Conference on Computer Vision (ICCV), 2019, pp. 3828-3838.

Clement Godard et al., "Unsupervised Monocular Depth Estimation with Left-Right Consistency", 2017 IEEE Conference on Computer Vision and Pattern Recognition (CVPR), 2017, pp. 270-279.

* cited by examiner

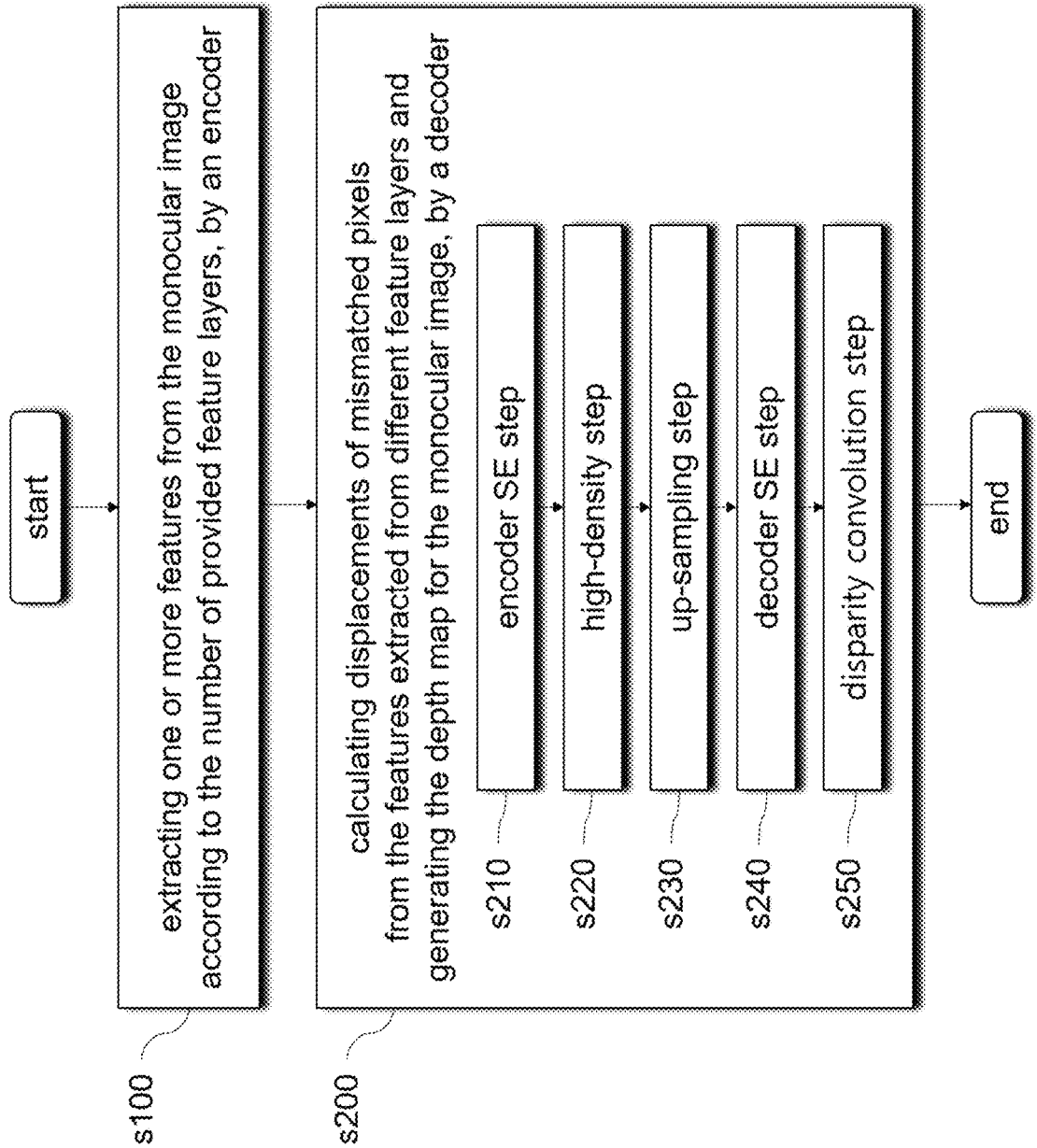

APPARATUS AND METHOD FOR GENERATING DEPTH MAP USING MONOCULAR IMAGE

CROSS-REFERENCE TO RELATED APPLICATION

This application claims priority to Korean Patent Application No. 10-2021-0054824 filed on Apr. 28, 2021, which is hereby incorporated by reference in its entirety.

Acknowledgement

This research was supported by the Ministry of Science and ICT (MSIT), Republic of Korea, under the Grand Information Technology Research Center support program (IITP-2021-2016-0-00318) supervised by an Institute for Information & communications Technology Planning & Evaluation (IITP).

BACKGROUND

The present invention relates to an apparatus and method for generating a depth map using a monocular image, and more specifically, to an apparatus and method for generating a depth map using a monocular image, which can quickly estimate a depth from the monocular image by reducing the amount of computation while having an accuracy higher than that of the prior art by using a deep convolution neural network (DCNN) optimized based on an encoder-decoder architecture.

With the advancement in the field of small robots and drones, various techniques for unmanned autonomy are developed. The techniques may be categorized into a recognition area for recognizing surrounding environments, a determination area for planning a driving route based on the recognized environments, and a control area for driving along the planned route. It is very important in this unmanned autonomy technique to quickly and accurately visualize two-dimensionally captured images in three dimensions of real world using a depth map, and this is since that it is helpful for the small robots and drones to grasp a location or avoid obstacles.

A three-dimensional (3D) depth estimation technique using a depth map may be largely divided into an active type and a passive type. Although a laser scanner, which is a representative example of the active type, provides high accuracy and 3D depth information, there is a disadvantage in that it is difficult to apply to a real environment until now due to the low resolution and high price. In addition, an active lighting method based on structured light is difficult to use in an outdoor environment where strong lighting exists due to the limitation of the structured light, and the range of depth that can be estimated to the maximum is limited to around 10 meters.

As the passive method, there is stereo matching that estimates 3D information from multi-view images acquired using two or more cameras, in which two cameras are required, and since binocular images captured by the two cameras should be analyzed, a large amount of computation and storage space are required.

That is, although the conventional 3D depth estimation technique using a depth map may recognize three dimensions using a depth sensor such as a LiDAR, a structured light sensor or the like, since the sensors are voluminous and heavy and consume much power, there is a limit in applying the technique to small robots or drones. Accordingly, a technique capable of three-dimensionally recognizing a photographed object with a compact size, low cost, and low power is required in the corresponding field.

SUMMARY

Therefore, the present invention has been made in view of the above problems, and it is an object of the present invention to provide an apparatus and method for generating a depth map using a monocular image, the apparatus comprising: an encoder for extracting one or more features from the monocular image according to the number of feature layers, and a decoder for calculating displacements of mismatched pixels from the features extracted from different feature layers and generating a depth map for the monocular image to apply the apparatus to a drone or a small robot that should mount lightweight software and hardware by achieving a low delay time together with high accuracy and high resolution compared to the prior art, although the depth map is generated with only a small number of parameters.

To accomplish the above object, according to one aspect of the present invention, there is provided an apparatus for generating a depth map using a monocular image, the apparatus comprising: a DCNN optimized based on an encoder and decoder architecture, wherein the encoder extracts one or more features from the monocular image according to the number of provided feature layers, and the decoder calculates displacements of mismatched pixels from the features extracted from different feature layers, and generates the depth map for the monocular image.

To accomplish the above object, there is provided a method of generating a depth map using a monocular image, the method comprising the steps of: extracting one or more features from the monocular image according to the number of provided feature layers, by an encoder; and calculating displacements of mismatched pixels from the features extracted from different feature layers and generating the depth map for the monocular image, by a decoder.

BRIEF DESCRIPTION OF THE DRAWINGS

FIG. 4 is a view showing a method of generating a depth map using a monocular image of the present invention.

DETAILED DESCRIPTION

Although general terms widely used at present are selected as terms used in this specification as much as possible considering the functions of the present invention, this may vary according to the intention of those skilled in the art, precedents, or emergence of new techniques. In addition, in specific cases, there are terms arbitrarily selected by an applicant, and in this case, the meaning of the terms will be described in detail in the corresponding description of the present invention. Therefore, the terms used in the present invention should be defined based on the meaning of the terms and the overall contents of the present invention, not by the simple names of the terms.

Unless otherwise defined, all terms used herein, including technical or scientific terms, have the same meaning as commonly understood by those skilled in the art. The terms such as those defined in a commonly used dictionary should be interpreted as having a meaning consistent with the meaning in the context of related techniques, and should not be interpreted as an ideal or excessively formal meaning unless clearly defined in this application.

Apparatus for Generating Depth Map Using Monocular Image

Figure 1:
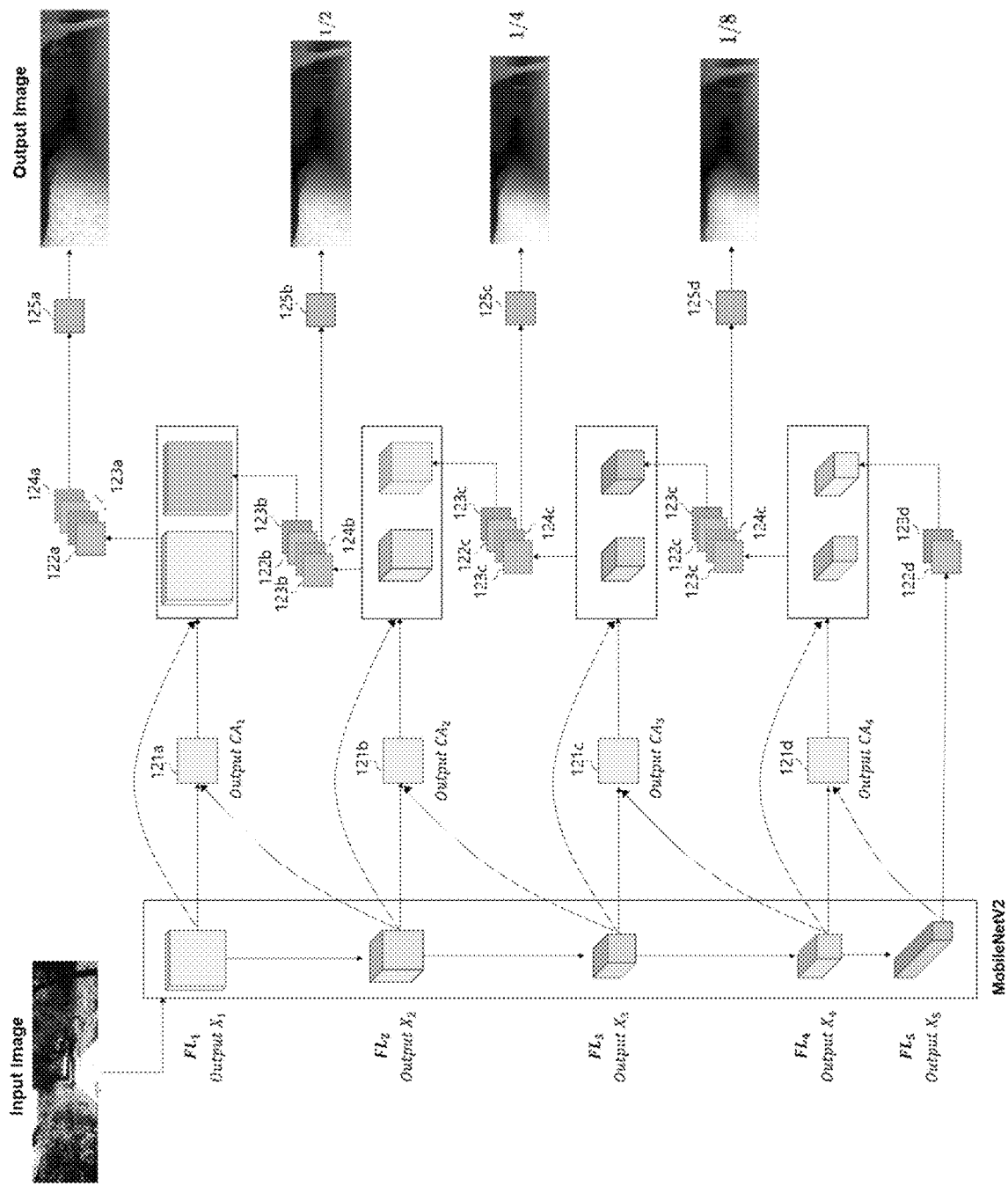
FIG. 1 is a view showing the configuration of an apparatus for generating a depth map using a monocular image of the present invention.
Figure 2:
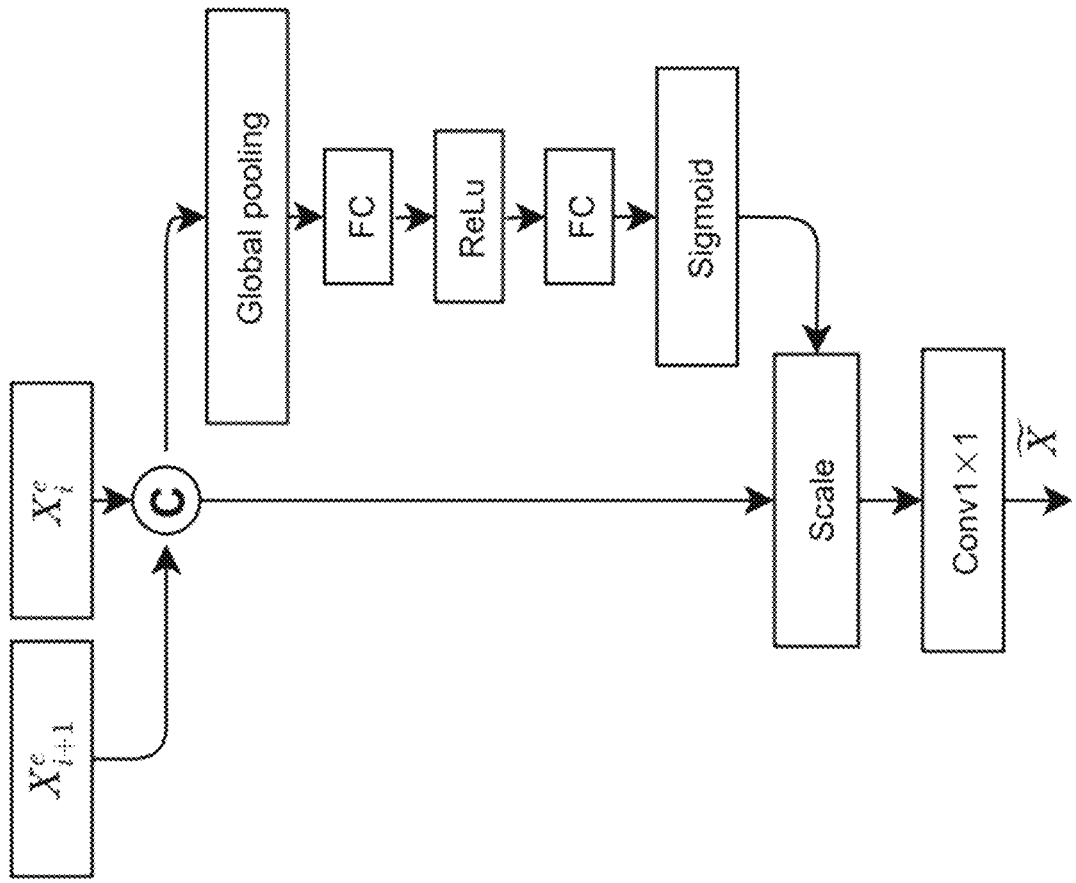
FIG. 2 is a view showing an encoder SE block according to an embodiment of the present invention.
Figure 3:
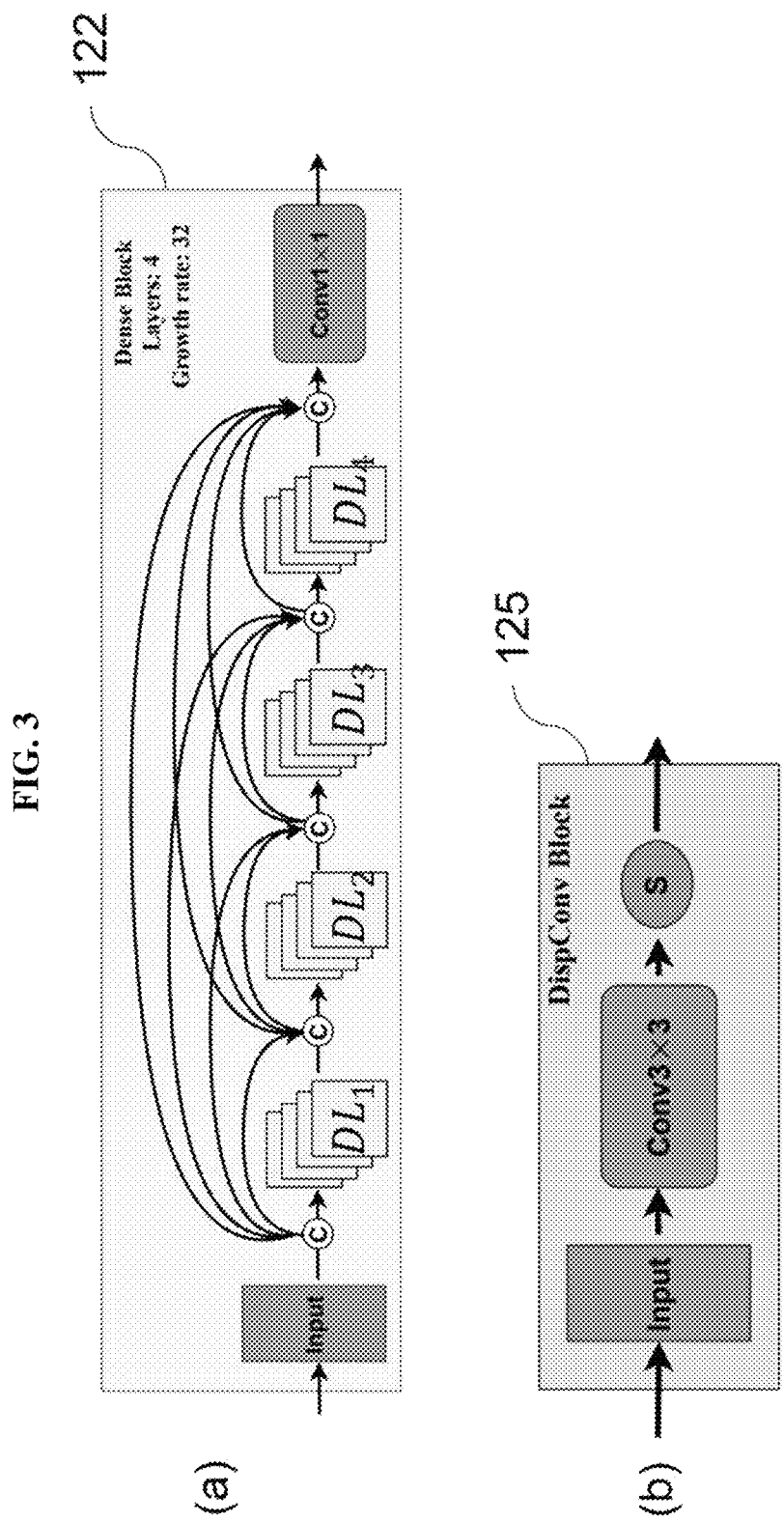
FIG. 3 is a view showing (a) a high-density block and (b) a disparity convolution block according to an embodiment of the present invention.

Hereinafter, an embodiment of the present invention will be described in detail with reference to the accompanying drawings. FIG. 1 is a view showing the configuration of an apparatus for generating a depth map using a monocular image of the present invention. FIG. 2 is a view showing an encoder SE block 121 according to an embodiment of the present invention. FIG. 3 is a view showing (a) a high-density block 122 and (b) a disparity convolution block 125 according to an embodiment of the present invention.

First, referring to FIG. 1, a depth map generation apparatus using a monocular image of the present invention includes a DCNN 100 optimized based on an encoder 110 and decoder 120 architecture.

In addition, since the DCNN 100 is based on pixels when it estimates a depth from a monocular image, it should acquire semantic features and spatial information of an object to estimate the boundary of the object. Therefore, most preferably, the DCNN 100 may further include a pose estimation network (PoseNet) and a depth estimation network (DepthNet) to learn data sets on the basis of unsupervised learning.

First, since the DCNN 100 learns data sets on the basis of unsupervised learning, a data set including a Ground Truth Depth, i.e., a separate correct answer value, is not required, and accordingly, there is an effect of reducing the cost for providing a data set having a correct answer value.

In addition, the pose estimation network (PoseNet) may regress conversion between adjacent frames used for reconstructing a monocular image in the data set. For example, 6 Degrees of Freedom (DoF) may be predicted based on the monocular image, and the first three dimension represents a translation vector, and next three dimension may represent the Euler angle. The depth estimation network (DepthNet) may calculate a loss that occurs during the unsupervised learning based on the output of the pose estimation network (PoseNet), and then estimate a depth map for each monocular image in the data set.

Next, in the architecture of the optimized DCNN 100, the encoder 110 extracts one or more features $X_i$ (i=1, 2, 3, 4 . . . n) from the monocular image according to the number of provided feature layers. The number of features $X_i$ may be the same as the number of provided feature layers.

Most preferably, the encoder 110 may be based on MobileNetV2 to be mounted on a drone or a small robot for fast computation.

Conventionally, there are various CNN architectures such as SqueezeNet, MobileNet, MobiletNetV2, and MobileNetV3 suitable for the encoder 110. All of these neural networks may classify objects from an image without need of complex calculations and may be easily distributed to embedded systems in real-time. However, SqueezeNet and MobileNet classify images with a small piece information of input images and thus have a disadvantage of low accuracy. In addition, although MobileNetV3 is faster than MobileNetV2 in classifying images, it has a disadvantage of low accuracy in a work of image segmentation or object detection that requires more pixel-based information. Therefore, most preferably, the encoder 110 of the present invention may be based on MobileNetV2 trained in advance using data set ImageNet.

In addition, most preferably, the encoder 110 may have a first feature layer $FL_1$ to a fifth feature layer $FL_5$ provided with 16, 24, 32, 96, and 160 channels at the scales of ½, ¼, ⅛, ⅟16, and ⅟32, respectively. In addition, a first feature $X_i$ to a fifth feature $X_5$ may be extracted from the feature layers, respectively.

Next, the decoder 120 calculates displacements of mismatched pixels from the features $X_i$ and $X_{i+1}$ extracted from different feature layers, and generates a depth map for the monocular image.

The decoder 120 may include an encoder SE block 121, a high-density block 122, an up-sampling block 123, a decoder SE block 124, and a disparity convolution block 125 to generate a depth map for the monocular image.

More specifically, the encoder SE block 121 may generate first channel information $C_1$ using the features $X_i$ and $X_{i+1}$ extracted from different feature layers to enable channel attention, and outputs first major channel information $CA_1$ from the first channel information $C_1$.

Referring to FIG. 2, for example, the encoder SE block 121 is denoted by $x_n$, and one or more encoder SE blocks may be provided. The encoder SE block 121 may receive a feature $X_i$ extracted from the i-th feature layer $FL_1$ of the encoder 110 and a feature $X_{i+1}$ extracted from the i+1-th feature layer $FL_{i+1}$ (i=1, 2, . . . n). Then, the encoder SE block 121 may perform a global pooling process of generating the first channel information $C_1$ by averaging and compressing the two features $X_i$ and XIII.

In addition, the encoder SE block 121 may determine the first major channel information $CA_1$ from the first channel information $C_1$ using a fully-connected (FC) function, and activate the first major channel information $CA_1$ with a higher weighting value using a ReLu function. This series of processes may be referred to as a Squeeze process.

In addition, the encoder SE block 121 may perform 1×1 convolution after expanding the compressed first major channel information $CA_1$ using a fully-connected (FC) function and a Sigmoid function and then scaling the size. This series of processes may be referred to as an excitation process. Here, the 1×1 convolution may reduce the number of parameters for the entire operation by reducing the channels using a filter having a size of 1×1.

Accordingly, since the encoder SE block 121 may extract one or more features $X_i$ only from a monocular image captured by one camera, not a stereo image captured by two or more cameras, there is an effect of remarkably reducing the number of stored or processed images. In addition, since the first major channel information $CA_1$ may be output using the features $X_i$ and $X_{i+1}$ extracted from two different feature layers $FL_i$ and $FL_{i+1}$ in the encoder 110, the operation parameters of the decoder 120 may be reduced remarkably, and therefore, there is a remarkable effect of reducing the operation delay time.

Next, referring to FIG. 3(a), the high-density block 122 may learn the features according to the number of density layers DL and a growth rate, and then output a feature set $XC_i$. In addition, the high-density block 122 may include a plurality of density layers $DL_i$, and an arbitrary density layer $DL_i$ may receive a feature set $XC_{i-1}$ obtained from a previous density layer $DL_{i-1}$. In addition, the arbitrary density layer $DL_i$ may output a feature set $XC_i$ by adding the learned features to the feature set $XC_{i-1}$ obtained from the previous density layer $DL_{i-1}$.

Most preferably, the high-density block 122 may include a first density layer $DL_1$ to a fourth density layer $DL_4$ and may include a plurality of channels between the density layers, and the growth rate may be 32. Here, the channels may be classified into one input channel and a plurality of output channels. That is, for each of the density layers $DL_i$ (i=1, 2, 3, 4), the dimension of the output channel of the high-density block 122 may increase by 32 times according to the growth rate. Accordingly, the high-density block 122 may finally output a feature set $XC_i$ in the form of high-density collective knowledge.

Meanwhile, the high-density block 122 may further include 1×1 convolution to fuse the input channel and reduce the number of parameters for calculation. Accordingly, the high-density block 122 has an effect of alleviating a gradient loss problem, enhancing feature propagation, and enabling feature reuse.

Next, the up-sampling block 123 may perform a Nearest Neighbor Interpolation operation using double scaling for the feature set $XC_i$ to improve the resolution of the depth map.

Meanwhile, the up-sampling block 123 may perform up-sampling on the first major channel information $CA_1$ output from the encoder SE block 121, as well as on the feature set $XC_i$. In addition, the up-sampling block 123 may include 3×3 convolution and perform operation by expanding the feature set $XC_i$ on which the 1×1 convolution is performed by the high-density block 122.

Next, the decoder SE block 124 may generate second channel information $C_2$ from the feature set $XC_i$ up-sampled by the up-sampling block 123 to enable channel attention, and output second major channel information $CA_2$ from the second channel information $C_2$.

For example, first, the decoder SE block 124 may receive the up-sampled feature set $XC_i$ from the up-sampling block 123. Then, the decoder SE block 124 may perform a global pooling process of generating the second channel information $C_2$ by averaging and compressing the features aggregated in the feature set $XC_i$ at a high density.

In addition, the decoder SE block 124 may determine the second major channel information $CA_2$ from the second channel information $C_2$ using a fully-connected (FC) function, and activate the second major channel information $CA_2$ with a higher weighting value using a ReLu function. This series of processes may be referred to as a Squeeze process.

In addition, the decoder SE block 124 may perform 1×1 convolution after expanding the compressed second major channel information $CA_2$ using a fully-connected (FC) function and a Sigmoid function and then scaling the size. This series of processes may be referred to as an excitation process. Here, the 1×1 convolution may reduce the number of parameters for the entire operation by reducing the channels using a filter having a size of 1×1.

Therefore, since the decoder SE block 124 may output the second major channel information $CA_2$ using the features aggregated in the feature set $XC_i$ at a high density, the operation parameters of the decoder 120 may be reduced remarkably, and therefore, there is a remarkable effect of reducing the operation delay time.

Next, referring to FIG. 3(b), the disparity convolution block 125 may reactivate the weighting value of the second major channel information $CA_2$ output from the decoder SE block 124 using 3×3 convolution and a Sigmoid function.

Therefore, most preferably, the decoder 120 may perform decoding using all of the feature $X_i$ extracted from an arbitrary feature layer $FL_1$ provided in the encoder 110, the first major channel information $CA_1$, and the second major channel information $CA_2$ to generate the depth map.

Next, the decoder SE block 124 may be skip-connected to the encoder SE block 121. Here, the meaning of being skip-connected is to obtain more semantic information from the monocular image. That is, the present invention may finally generate a depth map having a more improved resolution by combining strong features of low resolution and weak features of high resolution using skip-connection between corresponding objects.

Therefore, as the present invention has a DCNN 100 optimized based on an encoder and decoder architecture, although the depth map is generated using as few parameters as only 4.1 million or so, there is a remarkable effect of applying the apparatus to a drone or a small robot by achieving a low delay time together with high accuracy and high resolution compared to the prior art.

Method of generating depth map using monocular image
Hereinafter, an embodiment of the present invention will be described in detail with reference to the accompanying drawings. Referring to FIG. 4, the method of generating a depth map using a monocular image of the present invention includes an encoding step (S100) and a decoding step (S200). It is as shown in [Table 1], and will be described below.

TABLE 1

| | Layer Description | channels | input dimension | output dimension | note |
|---|---|---|---|---|---|
| #0 | Input RGB image | 3 | H × W | — | |
| | Encoder Layers: MobileNetV2 | | | | |
| #1 | Feature layer 1 | 3/16 | H × W | H/2 × W/2 | |
| #2 | Feature layer 2 | 16/24 | H/2 × W/2 | H/4 × W/4 | |
| #3 | Feature layer 3 | 24/32 | H/4 × W/4 | H/8 × W/8 | |
| #4 | Feature layer 4 | 32/96 | H/8 × W/8 | H/16 × W/16 | |
| #5 | Feature layer 5 | 96/100 | H/16 × W/16 | H/32 × W/32 | |
| | Decoder layers | | | | |
| #6 | eSE layer 4 | 256/160 | H/32 × W/32 ⊕ H/16 × W/16 | H/16 × W/16 | U(#5) ⊕ #4 |
| #7 | eSE layer 3 | 128/96 | H/16 × W/16 ⊕ H/8 × W/8 | H/8 × W/8 | U(#4) ⊕ #3 |
| #8 | eSE layer 2 | 56/32 | H/8 × W/8 ⊕ H/4 × H/4 | H/4 × W/4 | U(#3) ⊕ #2 |
| #9 | eSE layer 1 | 40/24 | H/4 × W/4 ⊕ H/2 × H/2 | H/2 × W/2 | U(#2) ⊕ #1 |
| #10 | Dense block 4 + Upsampling 4 | 100/160 | H/32 × W/32 | H/16 × W/16 | Layer #5 |
| #11 | Conv3 × dSE + dense block 4 | 416/160 | H/16 × W/16 | H/16 × W/16 | #10 ⊕ #6 ⊕ #4 |
| #12 | Upsampling 3 | 96/96 | H/16 × W/16 | H/8 × W/8 | Upsampling #11 |
| #13 | Conv3 × 3 + dSE + dense block 3 | 288/96 | H/8 × W/8 | H/8 × W/8 | #12 ⊕ #7 ⊕ #3 |

TABLE 1-continued

| | Layer Description | channels | input dimension | output dimension | note |
|---|---|---|---|---|---|
| #14 | Upsampling 2 | 96/96 | H/8 × W/8 | H/4 × W/4 | Upsampling #13 |
| #15 | Conv3 × 3 + dSE + dense block 2 | 152/32 | H/4 × W/4 | H/4 × W/4 | #14 ⊕ #8 ⊕ #2 |
| #16 | Upsampling 1 | 32/32 | H/4 × W/4 | H/2 × W/2 | Upsampling #15 |
| #17 | dense block + Upsampling + Conv3 × 3 + dSE 1 | 80/24 | H/2 × W/2 | H × W | #16 ⊕ #9 ⊕ #1 |

First, at the encoding step (S100), one or more features are extracted from a monocular image according to the number of provided feature layers, by the encoder 110.

According to the embodiment of [Table 1] and FIG. 2, at the encoding step S100, a monocular image of an RGB format may be input. Here, the number of channels may be 3, and the input dimension may be H×W. In addition, at the encoding step (S100), a first feature $X_1$ to a fifth feature $X_5$ may be extracted from a first feature layer $FL_1$ to a fifth feature layers $FL_5$ provided in the encoder 110.

The first feature layer $FL_1$ may include 16 channels, and scale an input dimension of H×W by ½ to output an output dimension of (H/2)×(W/2). That is, like the first feature layer $FL_1$, the second feature layer $FL_2$ to the fifth feature layer FL 5 may include 24, 32, 96, and 160 channels, respectively, and scale input dimensions of H×W by ¼, ⅛, 1/16, and 1/32 to finally output an output dimension of (H/32)×(W/32).

Next, at the decoding step (S200), displacements of mismatched pixels are calculated from the features extracted from different feature layers, and a depth map is generated for the monocular image, by the decoder 120.

The decoding step (S200) may include an encoder SE step (S210), a high-density step (S220), an up-sampling step (S230), a decoder SE step (S240), and a disparity convolution step (S250) to generate a depth map for the monocular image.

First, at the encoder SE step (S210), first channel information $C_1$ may be generated using the features $X_i$ and $X_{i+1}$ extracted from different feature layers to enable channel attention, and first major channel information $CA_1$ may be output from the first channel information $C_1$, by the encoder SE block 121 in the decoder 120.

In other words, the encoder SE step (S210) may receive a feature $X_i$ extracted from the i-th feature layer $FL_i$ of the encoder 110 and a feature $X_{i+1}$ extracted from the i+1-th feature layer $FL_{i+1}$. Then, the encoder SE step (S210) may perform a global pooling process of generating the first channel information $C_1$ by averaging and compressing the two features $X_i$ and $X_{i+1}$.

Most preferably, the encoder SE step (S210) may be performed starting from the last feature layer. Referring to [Table 1], for example, at the encoder SE step (S210), the fifth feature $X_5$ extracted from the fifth feature layer $FL_5$ and the fourth feature $X_4$ extracted from the fourth feature layer $FL_4$ may be input into the encoder SE block 121, and the fourth feature $X_4$ extracted from the fourth feature layer $FL_4$ and the third feature $X_3$ extracted from the third feature layer $FL_3$ may be input into the encoder SE block 121, and this process may be performed by each encoder SE block 121. Finally, the second feature $X_2$ extracted from the second feature layer $FL_2$ and the first feature $X_i$ extracted from the first feature layer $FL_1$ may be input into the encoder SE block 121.

In addition, at the encoder SE step (S210), a global pooling process of generating the first channel information $C_1$ may be performed by averaging and compressing the two features $X_i$ and $X_{i+1}$.

In addition, at the encoder SE step (S210), the first major channel information $CA_1$ may be determined from the first channel information $C_1$ using a fully-connected (FC) function, and the first major channel information $CA_1$ may be activated with a higher weighting value using a ReLu function. This series of processes may be referred to as a Squeeze process.

In addition, the encoder SE step (S210) may perform 1×1 convolution after expanding the compressed major channel information $CA_1$ using a fully-connected (FC) function and a Sigmoid function and then scaling the size. This series of processes may be referred to as an excitation process. Here, the 1×1 convolution may reduce the number of parameters for the entire operation by reducing the channels using a filter having a size of 1×1.

Accordingly, since one or more features $X_i$ may be extracted only from a monocular image captured by one camera, not a stereo image captured by two or more cameras, at the encoder SE step (S210), there is an effect of remarkably reducing the number of stored or processed images. In addition, since the first major channel information $CA_1$ may be output using the features $X_i$ and $X_{i+1}$ extracted from two different feature layers $FL_i$ and $FL_{i+1}$ in the encoder 110, the operation parameters at the decoding step (S200) may be remarkably reduced in the future, and therefore, there is a remarkable effect of reducing the operation delay time.

Next, at the high-density step (S220), a feature set $XC_i$ may be output after learning the features according to the number of density layers DL and a growth rate, by the high-density block 122 in the decoder 120. That is, at the high-density step (S220), an arbitrary density layer $DL_i$ may output a feature set $XC_i$ by adding the learned features to the feature set $XC_{i-1}$ obtained from the previous density layer $DL_{i-1}$.

Most preferably, at the high-density step (S220), the dimension of the output channel of the high-density block 122 may be increased by 32 times according to the growth rate for each density layer $DL_i$ (i=1, 2, 3, 4), by the high-density block 122 including a first density layer $DL_1$ to a fourth density layer $DL_4$. Accordingly, at the high-density step (S220), a feature set $XC_i$ may be finally output in the form of high-density collective knowledge.

Meanwhile, at the high-density step (S220), 1×1 convolution may be performed on the feature set $XC_i$ to reduce the number of parameters for calculation. Accordingly, there is an effect of alleviating a gradient loss problem, enhancing feature propagation, and enabling feature reuse.

Next, at the up-sampling step (S230), a Nearest Neighbor Interpolation operation may be performed for the feature set $XC_i$ using double scaling by the up-sampling block 123 to improve the resolution of the depth map.

Meanwhile, at the up-sampling step (S230), 3×3 convolution may be performed on the feature set $XC_i$ so that the feature set $XC_i$ on which the 1×1 convolution is performed at the high-density step (S220) may be expanded and calculated.

Next, at the decoder SE step (S240), second channel information $C_2$ may be generated from the feature set $XC_i$ up-sampled at the up-sampling step (S230) to enable channel attention, and second major channel information $CA_2$ may be output from the second channel information $C_2$, by the decoder SE block 124 in the decoder 120.

For example, at the decoder SE step (S240), first, the up-sampled feature set $XC_i$ may be input from the up-sampling block 123. Then, at the decoder SE step (S240), a global pooling process of generating the second channel information $C_2$ by averaging and compressing the features aggregated in the feature set $XC_i$ at a high density may be performed.

In addition, at the decoder SE step (S240), the second major channel information $CA_2$ may be determined from the second channel information $C_2$ using a fully-connected (FC) function, and the second major channel information $CA_2$ may be activated with a higher weighting value using a ReLu function. This series of processes may be referred to as a Squeeze process.

In addition, the decoder SE step (S240) may perform 1×1 convolution after expanding the compressed second major channel information $CA_2$ using a fully-connected (FC) function and a Sigmoid function and then scaling the size. This series of processes may be referred to as an excitation process. Here, the 1×1 convolution may reduce the number of parameters for the entire operation by reducing the channels using a filter having a size of 1×1.

Therefore, since the second major channel information $CA_2$ may be output at the decoder SE step (S240) using the features aggregated in the feature set $XC_i$ at a high density, the operation parameters of the decoder 120 may be reduced remarkably, and therefore, there is a remarkable effect of also reducing the operation delay time.

Next, referring to FIG. 3(b), at the disparity convolution step (S250), the weighting value of the second major channel information $CA_2$ output from the decoder SE block 124 may be reactivated using 3×3 convolution and a Sigmoid function, by the disparity convolution block 125 in the decoder 120.

Accordingly, most preferably, at the decoding step (S200), decoding may be performed using all of the feature $X_i$ extracted from an arbitrary feature layer $FL_1$ provided in the encoder 110, the first major channel information $CA_1$, and the second major channel information $CA_2$ to generate the depth map.

Therefore, as the method of generating a depth map using a monocular image of the present invention is provided with an encoding step (S100) and a decoding step (S200), there is a remarkable effect of applying the method to a drone or a small robot that should mount lightweight software and hardware as high accuracy and high resolution may be output and low delay time is also achieved compared to the prior art although the depth map is generated using as few parameters as only 4.1 million or so.

As described above, although the embodiments have been described through the limited embodiments and drawings, those skilled in the art may make various changes and modifications from the above descriptions. For example, although the described techniques are performed in an order different from that of the described method, and/or components such as the systems, structures, devices, circuits, and the like described above are coupled or combined in a form different from those of the described method, or replaced or substituted by other components or equivalents, an appropriate result can be achieved.

Therefore, other implementations, other embodiments, and those equivalent to the claims also fall within the scope of the claims described below.

According to the present invention as described above, as an encoder for extracting one or more features from a monocular image according to the number of feature layers, and a decoder for calculating displacements of mismatched pixels from the features extracted from different feature layers and generating a depth map for the monocular image are provided, there is an effect of applying the apparatus to a drone or a small robot that should mount lightweight software and hardware by achieving a low delay time together with high accuracy and high resolution compared to the prior art, although the depth map is generated with only a small number of parameters.

What is claimed is:

1. An apparatus for generating a depth map using a monocular image, the apparatus comprising:
    a deep convolution neural network (DCNN) optimized based on an encoder and decoder architecture, wherein
    the encoder extracts one or more features from the monocular image according to a number of provided feature layers,
    the decoder calculates displacements of mismatched pixels from the features extracted from different feature layers, and generates the depth map for the monocular image, and
    the decoder includes:
        an encoder Squeeze-and-Excitation block (SE block) for generating first channel information by receiving a first feature extracted from a first feature layer and a second feature extracted from a second feature layer different than the first feature layer, concatenating the first feature with the second feature, and performing a global pooling process after the first feature and second feature are concatenated to enable channel attention, scaling the first channel information, and outputting first major channel information from the first channel information after the scaling;
        a high-density block for learning the features according to a number of density layers and a growth rate, and outputting a feature set;
        an up-sampling block for performing a Nearest Neighbor Interpolation operation using double scaling for the feature set to improve a resolution of the depth map, and performing up-sampling on the first major channel information and the feature set;
        a decoder SE block for receiving the feature set up-sampled by the up-sampling block, performing a global pooling process of generating second channel information by averaging and compressing the first feature extracted from the first feature layer and the second feature extracted from the second feature layer aggregated in the feature set up-sampled by the up-sampling block, determining second major channel information from the second channel information by using a fully-connected (FC) function, activating the second major channel information with a weighing value using a ReLu function, performing 1×1 convolution after expanding the second major channel information using the FC function and a Sigmoid function, and outputting the second major channel information after the convolution; and
        a disparity convolution block for reactivating the weighting value of the second major channel information output from the decoder SE block using 3×3 convolution and the Sigmoid function.

2. The apparatus according to claim 1, wherein the encoder is based on MobileNetV2 to be mounted on a drone or a small robot for fast computation.

3. The apparatus according to claim 1, wherein the decoder performs decoding using all of the features extracted from an arbitrary feature layer provided in the encoder, the first major channel information, and the second major channel information.

4. The apparatus according to claim 1, wherein the decoder SE block is skip-connected to the encoder SE block.

5. The apparatus according to claim 1, wherein the DCNN includes a pose estimation network (PoseNet) and a depth estimation network (DepthNet) to learn data sets on a basis of unsupervised learning, and estimates a shape of an object in the monocular image.

6. A method of generating a depth map using a monocular image, the method comprising:
   extracting one or more features from the monocular image according to a number of provided feature layers, by an encoder;
   calculating displacements of mismatched pixels from the features extracted from different feature layers and generating the depth map for the monocular image, by a decoder;
   generating first channel information by receiving a first feature extracted from a first feature layer and a second feature extracted from a second feature layer different than the first feature layer, concatenating the first feature with the second feature, and performing a global pooling process after the first feature and second feature are concatenated to enable channel attention, scaling the first channel information, and outputting first major channel information from the first channel information after the scaling;
   learning the features according to a number of density layers and a growth rate, and outputting a feature set;
   performing a Nearest Neighbor Interpolation operation using double scaling for the feature set to improve a resolution of the depth map, and performing up-sampling on the first major channel information and the feature set;
   receiving the up-sampled feature set, performing a global pooling process of generating second channel information by averaging and compressing the first feature extracted from the first feature layer and the second feature extracted from the second feature layer aggregated in the up-sampled feature set, determining second major channel information from the second channel information by using a fully-connected (FC) function, activating the second major channel information with a weighing value using a ReLu function, performing 1×1 convolution after expanding the second major channel information using the FC function and a Sigmoid function, and outputting the second major channel information after the convolution; and
   reactivating the weighting value of the outputted second major channel information using 3×3 convolution and the Sigmoid function.

\* \* \* \* \*